United States Patent Office 2,757,123
Patented July 31, 1956

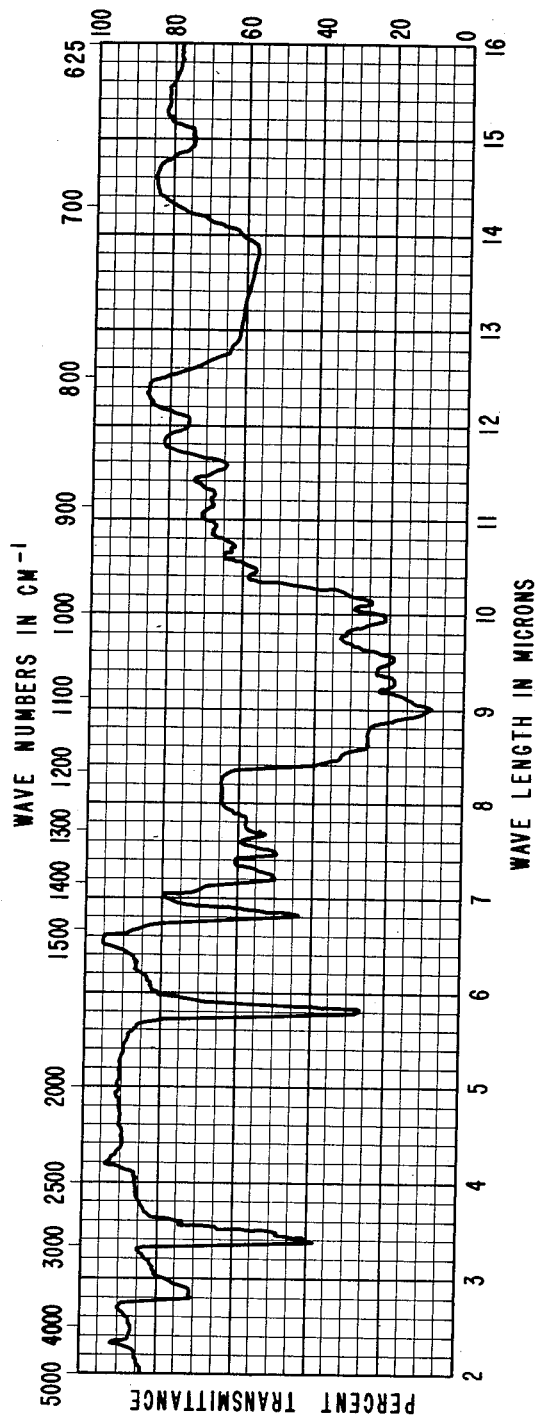
Fig. 1 — INFRARED ABSORPTION SPECTRUM OF AMIMYCIN BASE
INVENTORS
BEN A. SOBIN
JOHN B. ROUTIEN
THOMAS M. LEES
THEIR ATTORNEYS

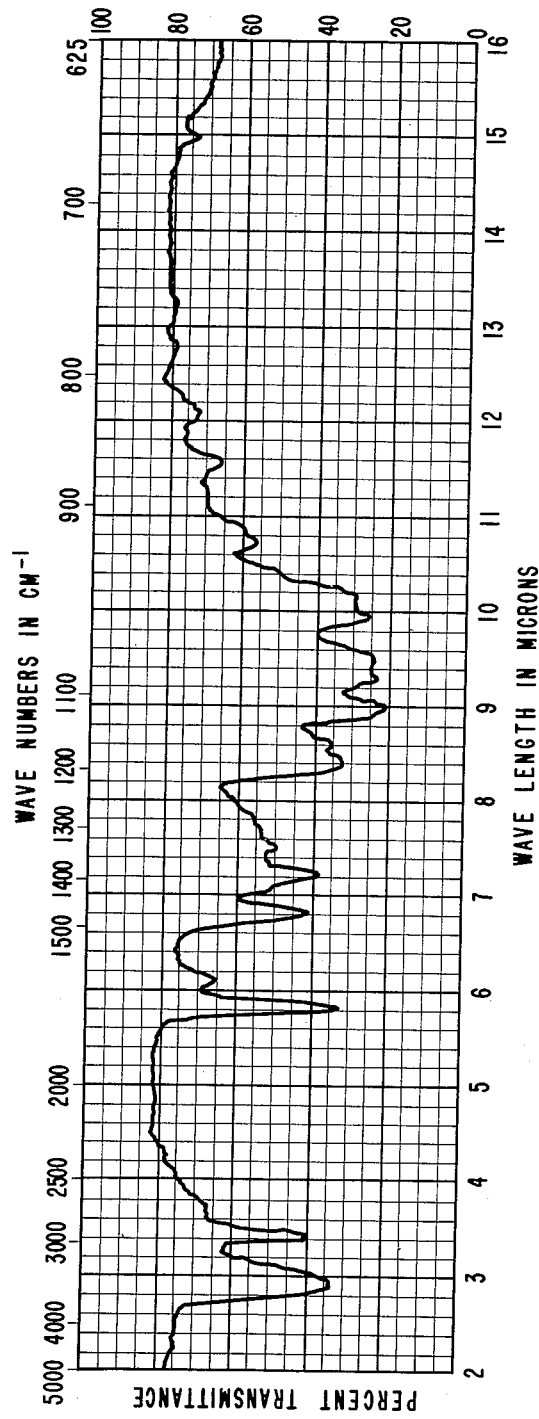

2,757,123

OLEANDOMYCIN, ITS SALTS AND PRODUCTION

Ben A. Sobin, Flushing, N. Y., John B. Routien, Tenafly, N. J., and Thomas M. Lees, Baldwin, N. Y., assignors to Chas. Pfizer & Co., Inc., Brooklyn, N. Y., a corporation of Delaware Continuation of application Serial No. 358,804, June 1, 1953. This application June 29, 1955, Serial No. 518,722

9 Claims. (Cl. 167—65)

This invention relates to a new and useful antibiotic called oleandomycin and more particularly, to its production by fermentation, to methods for its recovery and concentration from crude solutions, such as fermentation broths, to processes for its purification, and to methods for the preparation of its salts. The invention includes within its scope the antibiotic in dilute forms, as crude concentrates and in pure crystalline forms. These novel products are especially useful in combatting pathogenic microorganisms, particularly Gram-positive microorganisms. The present application is a continuation of our copending application Serial No. 358,804 filed June 1, 1953 and now abandoned.

The new antibiotic is formed during the cultivation under controlled conditions, of a new strain of a species of microorganism known as *Streptomyces-antibioticus*, which was identified by planting and testing a culture thereof on media normally used for the identification of such microorganisms. A culture of the microorganism has been deposited in the American Type Culture Collection, Washington, D. C., and added to its collection of microorganisms as ATCC 11891. The identification of this new strain, designated Isolate No. 15784–1, in the culture collection of Chas. Pfizer & Co., Inc., of Brooklyn, N. Y. was made with the aid of Bergey's "Manual of Determinative Bacteriology," sixth edition (1948).

The cultural characteristics of the new strain of *S. antibioticus* are set forth in the following table. Except where otherwise noted, the results are based upon six replicates incubated for two weeks. The colors where R is written are those of Ridgway, "Color Standards and Nomenclature."

Some of the significant differences between the new strain ATCC 11891 and the description of *S. antibioticus* in Bergey's Manual are described in Table II.

TABLE II

| Medium | Strain ATCC 11891 | Bergey's Description |
|---|---|---|
| Gelatin | Gray, waxy mycelium; no spores. | Dark brown growth on surface, with patches of gray aerial mycelium. |
| Litmus milk | (In skimmed milk, no litmus.) Creamy white to dark brown ring; coagulation and hydrolysis. | Thick, brownish ring on surface of milk. Mouse gray aerial mycelium with greenish tinge, growth becomes brown. No coagulation of milk; no clearing. |
| All media containing organic substances. | Soluble pigment light brown to dark brown. | Soluble pigment deep brown. |

The strain of *S. antibioticus* described in Bergey's Manual produces the antibiotic actinomycin, which from the data given hereinafter, is clearly established to be different from oleandomycin.

It is to be understood that for the production of oleandomycin the present invention is not limited to this particular organism or to organisms fully answering the above description, which is given only for illustrative purposes. In fact, it is especially desired and intended to include the use of mutants produced from the described organism by various means, such as X-radiation, ultraviolet radiation, nitrogen mustards, and the like.

Oleandomycin shows high activity against a wide variety of microorganisms. As previously mentioned, however, it is particularly noteworthy in its action on Gram-positive organisms. While it demonstrates some activity against Gram-negative organisms, this activity is generally of a somewhat lower level. The following table illustrates the antibiotic spectrum of oleandomycin against a variety of Gram-negative and Gram-positive microorganisms. These tests were run by seeding nutrient broth containing various concentrations of the pure antibiotic with the particular organism specified. The "minimum inhibitory concentration" indicated in Table III is the minimum concentration of the antibiotic (in micrograms/milliliter) at which growth of the microorganism failed to occur. Since the highest concentration employed in this test was 100 mcg./ml., the "minimum inhibitory concentration" is not precisely stated

TABLE I

*Streptomyces antibioticus*

ATCC No. 11891

| Medium | Amount of Growth | Color — Aerial Mycelium and Sporulation | Color — Soluble Pigment | Remarks |
|---|---|---|---|---|
| Glucose-Asparagine Agar | Moderate | White aerial mycelium; poor sporulation. | Medium brown to dark brown. | Reverse brown; conidiophores in clusters; no spirals; spores 0.65 x 1.0µ. |
| Gelatin | do | Gray, waxy mycelium; no sporulation. | Dark brown | Good liquefaction. |
| Skimmed milk (28° C.) | do | Creamy white ring | do | No coagulation; hydrolysis. No change in pH. |
| Glucose agar | do | Light brown, waxy, transparent growth; no sporulation. | Light brown | Reverse light brown. |
| Calcium malate | Poor to moderate | White aerial mycelium; sporulation poor, grayish white. | None | Reverse creamy white, calcium malate digested. |
| Synthetic agar | Poor | Mouse-gray (R) sporulation | do | Reverse white to light gray. |
| Nutrient agar | do | Light brown, waxy, transparent growth. | Medium brown | Reverse light brown. |
| Emerson's agar | Poor to moderate | Light gray to yellow, waxy wrinkled mycelium; no sporulation. | Dark brown | Do. |
| Cellulose | Poor | White, aerial mycelium | Light brown | |
| Dextrose nitrate broth | do | | None | Nitrates not reduced. |
| Potato discs | Moderate | Near Dawn Gray (R) sporulation | Dark brown to black | |
| Starch plates | Poor | Yellow to brown, waxy growth; sporulation near Hathi Gray (R). | None | Reverse dark yellow to gray; no hydrolysis. | where such concentration apparently exceeded 100 mcg./ml. The test was conducted under standardized conditions.

TABLE III

*Spectrum of oleandomycin*

| Organism | Minimum Inhibitory Concentration Oleandomycin, mcg./ml. |
|---|---|
| Gram-Negative Organisms: | |
| Brucella bronchiseptica | 25 |
| A. aerogenes 2 | >100 |
| E. coli 21 | >100 |
| Proteus Sp. 1 | >100 |
| Ps. aeruginosa 173 | >100 |
| Salmonella typhosa 344 | >100 |
| K. pneumoniae 132 | >100 |
| S. paratyphia A134 | >100 |
| S. paratyphia B139 | >100 |
| Listeria monocytogenes | 3.12 |
| Neisseria gonorrheae | 6.25 |
| Niesseria catarrhalis | 3.12 |
| Neisseria meningitidis | 6.25 |
| Gram-Positive Organisms: | |
| Strep. faecalis 121 | 1.56 |
| Micrococcus pyogenes var. aureus 5 | 0.19 |
| Micrococcus pyogenes var. aureus 209 | <0.19 |
| M. pyogenes var. albus 3 | 0.78 |
| B. subtilis 219 | 0.39 |
| Diplococcus pneumoniae: | |
| Type I | 6.25 |
| Type I, A. T. C. C. | <0.19 |
| Type III | 3.12 |
| Type V | 3.12 |
| Erysipelothrix rhusiopathiae: | |
| 15A | 0.3 |
| E-1 | 0.7 |
| G-2 | 0.7 |
| G-3 | 0.5 |
| Corynebacterium xerose | 6.25 |
| Clostridium perfringens | 1.5 |
| Clostridium sporogenes | 1.5 |
| Clostridium tetani | 1.5 |
| Bacillus anthracis | .7 |
| Fungi: | |
| Candida albicans 8 | >100 |

Table IV shows the results of similar tests conducted in another laboratory on different organisms or strains from those set forth in Table III, and further illustrates the spectrum of oleandomycin. In these tests, the maximum concentration of the antibiotic was 900 mcg./ml.

TABLE IV

*Oleandomycin spectrum, additional microorganisms*

| Organism | Minimum Inhibitory Concentration Oleandomycin mcg./ml. |
|---|---|
| Gram-Negative Organisms: | |
| E. coli | 225 |
| E. coli | 450 |
| E. typhosa | 225 |
| Salmonella sp | 450 |
| Aerobacter aerogenes | 225 |
| S. paratyphosa | >900 |
| Klebsiella pneumoniae | 225 |
| Brucella bronchisepticus | 7 |
| B. pyocyaneus | >900 |
| NA II SM Resist | 112 |
| NA IV S. typhosa | 112 |
| E. typhi-murium | 225 |
| S. typhi-murium | 225 |
| S. newport | 450 |
| S. enteritidis | 225 |
| S. cholera suis | 225 |
| Proteus vulgaris | >900 |
| Gram-Positive Organisms: | |
| Strep. hemo | <1.7 |
| D. pneumoniae | <1.7 |
| Staph. h | <1.7 |
| B. subtilis | <1.7 |
| Enterococcus | <1.7 |
| Cl. welchii | 7 |
| Staph. aureus 235 | <1.7 |
| Fungi: | |
| Monilia albicans | >900 |

The new antibiotic was also found to be highly effective against organisms resistant to the usual commercially available antibiotics. For example, certain resistant strains of *Micrococcus pyogenes* var. *aureus* isolated from clinical cases were subjected to oleandomycin as above indicated to determine the minimum inhibitory concentration. The minimum inhibitory concentration of a variety of well known antibiotics was also run for control purposes and the results of these tests appear in Table V.

TABLE V

| M. pyogenes var. aureus Strain | Antibiotic: Minimum Inhibitory Concentration in mcg./ml. | | | | | | | |
|---|---|---|---|---|---|---|---|---|
| | Oleandomycin | Oxytetracycline [1] | Aureomycin | Chloramphenicol | Bacitracin | Neomycin | Penicillin | Polymyxin |
| 1 | 0.78 | >100 | 100 | 6.25 | 56 | 3.12 | 60 | >250 |
| 2 | 3.12 | >100 | 56 | 6.25 | 28 | 3.12 | 15.0 | >250 |
| 3 | 1.56 | >100 | 50 | 6.25 | 28 | 1.56 | 7.5 | >250 |
| 4 | 1.56 | >100 | 100 | 12.5 | 14 | 25.00 | 60 | >250 |
| 5 | 1.56 | >100 | 50 | 6.25 | 14 | 1.56 | 15.0 | >250 |
| 6 | 3.12 | >100 | 50 | 12.5 | 28 | 50.0 | 7.50 | >250 |
| 7 | 0.78 | >100 | 100 PI | 6.25 | 28 | 0.78 | 60.0 | >250 |
| 8 | 1.56 | >100 | 100 | 6.25 | 14 | 1.56 | 3.75 | >250 |
| 9 | 0.78 | >100 | 50 PI | 3.12 | 56 | 1.56 | 60 | >250 |
| 10 | 0.78 | >100 | >100 | 6.25 | 14 | 3.12 | 60 | >250 |
| 11 | 0.78 | .78 | 0.39 | 3.12 PI | 28 | 6.0 | 3.75 | >250 |
| 12 | 0.78 | >100 | >100 | 6.25 | 14 | <.78 | 60 | >250 |
| 13 | 0.78 | >100 | 50 | 6.25 | 28 | 3.12 | 0.47 | >250 |
| 14 | 0.78 | >100 | >100 | 6.25 | 14 | <.78 | 60 | >250 |
| 15 | 1.56 | >100 | 100 PI | 3.12 | 7 | <0.78 | 0.93 | >250 |
| 16 | 1.56 | >100 | 50 | 6.25 | 56 | <0.78 | 15.0 | >250 |
| 17 | 0.78 | >100 | 100 | 3.12 | 28 | 3.12 | 60 | >250 |
| 18 | 0.78 | >100 | 100 | 3.12 PI | 14 | 3.12 | 60 | >250 |

PI indicates partial inhibition.
[1] Sold under the trademark "Terramycin."

In addition to showing the effectiveness of the antibiotic against these resistant strains, these tests also indicate that the oleandomycin differs from oxytetracycline, aureomycin, chloramphenicol, bacitracin, neomycin, penicillin and polymyxin.

Oleandomycin has also been shown to be effective against a variety of mycobacteria, as indicated in Table VI which gives the results of tests performed on such mycobacteria. In this case, tubes of Dubos liquid medium were used as the test medium. The antibiotic was added to the medium at the various levels indicated in the first column of the table. The tubes of medium containing such levels or concentrations of the antibiotic were then seeded with cultures of the various mycobacteria specified, the identity of the species being indicated at the head of each of the columns in the table. The test was then conducted by incubating the tubes under sterile conditions for 36 hours and thereafter observing them to determine the presence or lack of growth of the mycobacteria. Lack of growth in the tubes at the end of the test period is indicated by a (—) sign, and growth is indicated by (+).

TABLE VI

Activity of oleandomycin against mycobacteria

| Mcg./ml. | ranae | phlei | smegmatis | 607 |
|---|---|---|---|---|
| 25.0 | — | — | — | — |
| 12.5 | — | — | — | — |
| 6.25 | — | — | — | — |
| 3.12 | — | — | — | — |
| 1.56 | — | — | — | — |
| .78 | + | + | + | + |
| .39 | + | + | + | + |
| .19 | + | + | + | + |

Oleandomycin has been found to possess a relatively low level of toxicity when used in test animals. For example, the $LD_0$ value, when the antibiotic is administered intraveneously to mice as a solution in water, is approximately 15 mg./20-gram mouse. Toxicity to other species and by other routes of administration is comparable.

Oleandomycin has also been found to possess a high order of activity *in vivo* against various pathogenic organisms. Mice of substantially uniform weight were intraperitoneally infected with certain strains of *Strep. hemolyticus, D. pneumoniae* and *M. pyogenes* var. *aureus* and treated with the antibiotic by subcutaneous injection in two 5 mg. doses daily for two and one-half days. The effectiveness of oleandomycin against these organisms in the mice thus treated is readily apparent from Table VII which compares the percent survival of treated and untreated mice.

TABLE VII

Activity of oleandomycin in vivo

| Organism | Animal: Treated, Untreated | Percent Survival | | |
|---|---|---|---|---|
| | | 48 hrs. | 96 hrs. | 7 days |
| Strep. hemo. C203Mv | Treated | 100 | 100 | 100 |
| | Untreated | 0 | 0 | 0 |
| D. pneumoniae 1/230 | Treated | 100 | 100 | 90 |
| | Untreated | 0 | 0 | 0 |
| M. pyogenes var. aureus No. 235 | Treated | 100 | 100 | 100 |
| | Untreated | 20 | 20 | 20 |

The invention includes within its scope a process for growing the microorganism *S. antibioticus*. The cultivation of this microorganism preferably takes place in aqueous nutrient media at a temperature of about 24–30° C., and under submerged conditions of agitation and aeration. Nutrient media which are useful for this process include a carbohydrate, such as sugars, starch, glycerol, corn meal, and a source of organic nitrogen, such as casein, soybean meal, peanut meal, wheat gluten, cottonseed meal, lactalbumin, enzymatic digest of casein, tryptone. A source of growth substances, such as distillers' solubles, yeast extract, molasses fermentation residues, as well as mineral salts, such as sodium chloride, potassium phosphate, sodium nitrate, magnesium sulfate and trace minerals such as copper, zinc and iron may also be utilized with desirable results. If excessive foaming is encountered during the fermentation, anti-foaming agents, such as vegetable oils, may be added to the fermentation medium. The pH of the fermentation tends to remain rather constant, but, if variations are encountered, a buffering agent, such as calcium carbonate may also be added to the medium.

Inoculum for the preparation of oleandomycin by the growth of *S. antibioticus* may be obtained by employing growth from slants on such media as Emerson's agar or beef lactose. The growth may be used to inoculate either shaken flasks or inoculum tanks for submerged growth, or, alternatively, the inoculum tanks may be seeded from the shaken flasks. The growth of the microorganism usually reaches its maximum in about two or three days. However, variations in the equipment used, the rate of aeration, rate of stirring and so forth may effect the speed with which the maximum activity is reached. In general, from about 24 hours to four days is a desirable period for producing the antibiotic. Aeration of the medium in tanks for submerged growth is maintained at the rate of about one-half to two volumes of free air per volume of broth per minute. Agitation may be maintained by suitable types of agitators generally familiar to those in the fermentation industry. Aseptic conditions must, of course, be maintained throughout the transfer of the inoculum and throughout the growth of the microorganism.

After growth of the microorganism, the mycelium, which is generally quite luxuriant and fine, may be removed from the fermentation broth by various standard equipment, such as filter-presses, centrifuges, and so forth. The oleandomycin may be recovered from fermentation broth by several different procedures. Alternatively, the whole broth may be used as is or it may be dried. The antibiotic may be further purified by various means; for instance, the compound may be extracted from aqueous solution at neutral or slightly alkaline pHs, preferably between about 6 and about 10, by means of a variety of water-immiscible organic solvents, including ethers, aromatic hydrocarbons, esters, ketones, lower alcohols and halogenated hydrocarbons. Examples of these are diethyl ether, benzene, toluene, ethyl acetate, butyl acetate, methyl isobutyl ketone, butanol, and chloroform. Even at acidic pHs some of these solvents extract an appreciable amount of antibiotic. This is particularly true of the water-immiscible alcohols, such as butanol, pentanols, and so forth. The antibiotic may be extracted from most solvent solutions back into acidified water, preferably at a pH of below about 2.5. If desired, the solvent extract may be concentrated before extraction into acidified water. By adjustment of the pH to neutrality or alkalinity, the antibiotic may be re-extracted into one of the solvents indicated above. Upon drying the solvent and concentrating the solution the antibiotic crystallizes in long white needles. The product may be recrystallized by cooling a solution thereof in hot ethyl acetate, chloroform, methylene chloride or ethylene dichloride. Further methods of recovery which suggest themselves include absorption on charcoal with subsequent elution, treatment with ion exchange resins, and development on alumina columns.

Oleandomycin is a basic, white, amorphous organic compound that is soluble in dilute, aqueous acids, and moderately soluble in water. It is very soluble in a number of organic solvents, such as methyl alcohol, ethyl alcohol, acetone and butanol. It is insoluble in hexane, carbontetrachloride, and di-n-butyl ether. An aqueous solution of the compound retains its stability for several hours at room temperature over a wide pH range. However, it is quite unstable on heating in acid solution. It is stable in a dry state or dissolved in anyhdrous solvents. The crystalline anhydrous antibiotic hydrochloride has a melting point at about 134–135° C. Both oleandomycin and its hydrochloride exhibit a broad, low intensity peak in the ultraviolet region at around 286–289 mμ (10 mg. in 10 ml. of methanol). When dissolved in chloroform, the antibiotic base shows a number of characteristic peaks in the infrared region, the more significant of which are the following frequencies (in reciprocal centimeters): 3510, 2910, 2890, 2840, 2790, 1710, 1460, 1385, 1335, 1305, 1280, 1180, 1160, 1110, 1075, 1050, 1005, 985, 960, 935, 895, 885 and 860. The base has been analyzed and found to contain the following elements in the proportions by weight specified:

| | |
|---|---|
| Carbon | 60.36 |
| Hydrogen | 9.21 |
| Nitrogen | 1.98 |
| Oxygen (by difference) | 28.45 |

When suspended in a potassium bromide pellet, the anhydrous hydrochloride also shows a number of characteristic peaks in the infrared region, the more significant of which are the following frequencies: 3380, 2940, 2890, 1710, 1640, 1465, 1380, 1330, 1190, 1160, 1115, 1075, 1055, 1010, 985, 935, 865, 828. The infrared spectrum is more particularly illustrated in the attached drawings. Oleandomycin is designated as amimycin in the drawings. The hydrochloride dissolved in methanol (C, 1%) has an $\alpha_D^{25} = -54°$.

The molecular weight of oleandomycin base, as determined by the ebullioscopic method, was found to be approximately 715.

When a sample of crystalline oleandomycin hydrochloride, which had been crystallized from ethyl acetate was dried at 100° for 18 hours, a loss in weight of 5.0% was observed. The dried material was analyzed and found to contain the following elements in the proportions by weight specified:

| | |
|---|---|
| Carbon | 57.63 |
| Hydrogen | 8.73 |
| Nitrogen | 1.87 |
| Chlorine (ionic) | 4.30 |
| Oxygen (by difference) | 27.47 |

This corresponds to the probable empirical formula $$C_{35}H_{63}NO_{12}HCl$$

for the anhydrous hydrochloride. The hydrochloride is very soluble in water and also occurs in various hydrated forms, such as the dihydrate, corresponding to the probable empirical formula, $C_{35}H_{63}NO_{12}HCl \cdot 2H_2O$.

Oleandomycin is clearly distinguished from other antibiotics by its properties, as evidenced by those properties described above and by paper chromatography measurements. Useful salts of the antibiotic can be prepared by methods well known in the art, as by treatment of the base with an appropriate acid in aqueous solution or under anhydrous conditions. For instance, the hydrochloride can be prepared by dissolving the base in acetone and passing hydrogen chloride gas into the solution. Under these conditions the product is obtained in impure form. Other acids, such as sulphuric and phosphoric acids, may be used to make the corresponding acid salts of the antibiotic.

The invention is further illustrated by the following examples, which are not to be considered as imposing any limitation thereon.

*Example I*

A slant of *S. antibioticus* ATCC 11891 on Emerson agar was cultivated under controlled conditions to develop spores for the purpose of inoculating a nutrient medium of the following composition:

| | Grams |
|---|---|
| Cerelose (dextrose hydrate) | 10 |
| Soybean meal | 10 |
| Sodium chloride | 5 |
| Distillers' solubles | 5 |
| Calcium carbonate | 1 |

This mixture of nutrients was diluted to a volume of one liter with water, adjusted to a pH of 7 with potassium hydroxide, and subjected to heat sterilization. Thereafter, the medium was cooled and the spores were added thereto under aseptic conditions. The cultivation of the organism was conducted in shaken flasks at about 25° C. for a period of two days. The mixture of broth and mycellum thus formed was then transferred to 20 times its volume of a sterile fermentation medium having the following composition:

| | Grams/liter |
|---|---|
| Cerelose (dextrose hydrate) | 10 |
| Sodium Chloride | 5 |
| Curbay Bg (molasses residue) | 5 |
| Corn Starch | 10 |
| Soybean Meal | 10 |

This medium was adjusted to pH 7 with potassium hydroxide, treated with 1 gram of calcium carbonate per liter, and sterilized in the usual manner, before transferring the broth and mycelium thereto. After seeding the medium with the organism from the shaken flasks, the mixture was subjected to agitation and aeration under sterile conditions for three days. The potency of the broth at this point was found to be 70 mcg./ml. The mycelium was removed by filtration and extracted twice with one-quarter volume of methyl isobutyl ketone. The combined solvent phases were concentrated to one-tenth volume under vacuum. The antibiotic was then extracted into water adjusted to a pH of about 2 with sulphuric acid. The aqueous phase was separated, washed with benzene to remove the methyl isobutyl ketone, and adjusted to a pH of 6.5. Thereafter the antibiotic was extracted several times with ether in which it was dried over anhydrous sodium sulfate. Removal of the ether by distillation resulted in crystallization of the antibiotic in the form of long white needles. Finally, the product was recrystallized from hot ethyl acetate. The recrystallized product so obtained was found to be highly effective against a variety of mycobacteria and Gram-positive microorganisms, as indicated in the tests described above.

*Example II*

Another fermentation medium was prepared from the following materials:

| | Grams |
|---|---|
| Soybean Meal | 15 |
| Cerelose (dextrose hydrate) | 20 |
| Corn Starch | 10 |
| Sodium Chloride | 5 |
| Distillers' Solubles | 5 |
| NZ Amine B (enzymatic digest of casein) | 5 |

These materials were added to one liter of water and the pH of the resulting mixture was adjusted to between 7 and 7.2 with potassium hydroxide. Five grams of calcium carbonate were added to act as a buffer during the fermentation. The medium was then autoclaved and seeded under sterile conditions with *S. antibioticus* inoculum prepared in accordance with the procedure set forth in Example I. After subjecting the inoculated medium to aeration and agitation under sterile conditions at about 28° C. for two days, the filtered broth was found to contain 100 micrograms of oleandomycin per ml. of solution.

Resort may be had to such modifications and equivalents as fall within the spirit of the invention and the scope of the appended claims.

What we claim is:

1. A process for producing oleandomycin, which comprises cultivating *Streptomyces antibioticus* No. ATCC 11891 in an aqueous nutrient medium containing a carbohydrate and a source of organic nitrogen, under submerged aerobic conditions until substantial antibacterial activity is imparted to said medium.

2. A process as claimed in claim 1 wherein the oleandomycin is recovered from the fermentation broth.

3. A process for producing oleandomycin, which comprises cultivating *Streptomyces antibioticus* No. ATCC 11891 in an aqueous nutrient medium containing a carbohydrate and a source of organic nitrogen, under agitated, submerged aerobic conditions at a temperature of from about 24° to about 30° C., for a period of from about one day to about four days.

4. A substance effective in inhibiting the growth of Gram-positive bacteria and mycobacteria, selected from the group consisting of a basic substance moderately soluble in water, very soluble in methyl alcohol, ethyl alcohol, acetone and butanol, insoluble in hexane, carbon tetrachloride and di-n-butyl ether, and capable of forming salts with acids and when dissolved in chloroform exhibits characteristic absorption in the infrared region at the following frequencies expressed in reciprocal centimeters: 3510, 2910, 2890, 2840, 2790, 1710, 1460, 1385, 1335, 1305, 1280, 1180, 1160, 1110, 1075, 1050, 1005, 985, 960, 935, 895, 885 and 860; whose dried crystalline hydrochloride contains the elements carbon, hydrogen, nitrogen, chlorine and oxygen in substantially the following proportions by weight:

| | |
|---|---|
| Carbon | 57.63 |
| Hydrogen | 8.73 |
| Nitrogen | 1.87 |
| Chlorine (ionic) | 4.30 |
| Oxygen (by difference) | 27.47 | whose dried crystalline hydrochloride displays a broad, low intensity peak at around 286–289 mµ in the ultraviolet region of the spectrum, and when dissolved in methanol (C, 1%) has the optical rotation $\alpha_D^{25} = -54°$, and when suspended in a potassium bromide pellet exhibits characteristic absorption in the infrared region at the following expressed in reciprocal centimeters: 3380, 2940, 2890, 1710, 1640, 1465, 1380, 1330, 1190, 1160, 1115, 1075, 1055, 1010, 985, 935, 865, 828; and the acid salts of said basic substance.

5. A basic substance effective in inhibiting the growth of gram-positive bacteria and mycobacteria and capable of forming salts with acids; which basic substance is moderately soluble in water, very soluble in methyl alcohol, ethyl alcohol, acetone and butanol, insoluble in hexane, carbon tetrachloride and di-n-butyl ether, and when dissolved in chloroform exhibits characteristic absorption in the infrared region at the following frequencies expressed in reciprocal centimeters: 3510, 2910, 2890, 2840, 2790, 1710, 1460, 1385, 1335, 1305, 1280, 1180, 1160, 1110, 1075, 1050, 1005, 985, 960, 935, 895, 885, and 860; whose dried crystalline hydrochloride contains the elements carbon, hydrogen, nitrogen, chlorine and oxygen in substantially the following proportions by weight:

| | |
|---|---|
| Carbon | 57.63 |
| Hydrogen | 8.73 |
| Nitrogen | 1.87 |
| Chlorine (ionic) | 4.30 |
| Oxygen (by difference) | 27.47 | whose dried crystalline hydrochloride displays a broad, low intensity peak at around 286–289 mµ in the ultraviolet region of the spectrum, and when dissolved in methanol (C, 1%) has the optical rotation $\alpha_D^{25} = -54°$, and when suspended in a potassium bromide pellet exhibits characteristic absorption in the infrared region at the following frequencies expressed in reciprocal centimeters: 3380, 2940, 2890, 1710, 1640, 1465, 1380, 1330, 1190, 1160, 1115, 1075, 1055, 1010, 985, 935, 865, 828.

6. An acid salt of the basic substance defined in claim 5.

7. A hydrochloride of the basic substance defined in claim 5.

8. The sulfate of the basic substance defined in claim 5.

9. The phosphate of the basic substance defined in claim 5.

References Cited in the file of this patent

FOREIGN PATENTS 888,918    Germany _____ July 8, 1949

OTHER REFERENCES

Waksman et al.: "The Actinomycetes and Their Antibiotics," pub. 1953 by Williams & Wilkins, Baltimore, Md., pp. 65–70, 170–185, 186, 188, 201, 219, 210.

"Antibiotics Annual 1954–1955," pub. 1955 by Medical Encyclopedia Inc., pp. 827–830.

Stevenson Nature, pp. 598–599, Sept. 25, 1954.

Pinnet-Sindico et al., Antibiotics Annual 1954–1955, pp. 724–727.

Abstracts of Papers No. 127 and 110, presented at the Antibiotics Symposium Oct. 25–29, 1954, Washington, D. C.

Ross Abstract of Paper No. 84, delivered at Antibiotics Symposium, Nov. 2, 3, and 4, 1955, Washington, D. C.